(12) United States Patent
Korich et al.

(10) Patent No.: US 7,581,991 B2
(45) Date of Patent: Sep. 1, 2009

(54) VEHICLE ELECTRIC CURRENT CONNECTOR ASSEMBLY WITH ELECTRIC CURRENT SENSORS

(75) Inventors: Mark D. Korich, Chino Hills, CA (US); Mark L. Selogie, Manhattan Beach, CA (US); Young Doo, La Palma, CA (US); Konstantinos Triantos, San Jose, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/171,828

(22) Filed: Jul. 11, 2008

(65) Prior Publication Data
US 2009/0023342 A1    Jan. 22, 2009

Related U.S. Application Data

(60) Provisional application No. 60/950,294, filed on Jul. 17, 2007.

(51) Int. Cl.
*H01R 13/66* (2006.01)
(52) U.S. Cl. .................................................. 439/620.21

(58) Field of Classification Search ............ 439/620.21, 439/620.22
See application file for complete search history.

(56) References Cited

U.S. PATENT DOCUMENTS

| 7,491,097 | B2 * | 2/2009 | Ishihara et al. ............... 439/763 |
| 2008/0105476 | A1 * | 5/2008 | Korich et al. ............... 180/65.2 |
| 2008/0252160 | A1 * | 10/2008 | Kavalsky et al. .............. 310/71 |
| 2009/0021971 | A1 * | 1/2009 | Korich et al. ................ 363/141 |
| 2009/0023305 | A1 * | 1/2009 | Korich et al. .................. 439/34 |
| 2009/0023306 | A1 * | 1/2009 | Korich et al. .................. 439/34 |
| 2009/0023342 | A1 * | 1/2009 | Korich et al. .......... 439/620.21 |

* cited by examiner

*Primary Examiner*—Ross N Gushi
(74) *Attorney, Agent, or Firm*—Ingrassia, Fisher & Lorenz, P.C.

(57) ABSTRACT

An assembly for transporting electric current in a vehicle includes a connector and a sensor package. The connector comprises a plurality of prongs. The plurality of prongs are configured to receive and transport electric current. The sensor package is electrically coupled to the connector, and comprises a plurality of sensors. Each of the plurality of sensors is electrically coupled to a different one of the plurality of prongs, and is configured to determine a measure of electric current thereof.

20 Claims, 7 Drawing Sheets

US 7,581,991 B2

VEHICLE ELECTRIC CURRENT CONNECTOR ASSEMBLY WITH ELECTRIC CURRENT SENSORS

CROSS-REFERENCES TO RELATED APPLICATIONS

This application claims the benefit of U.S. Provisional Application No. 60/950,294, filed Jul. 17, 2007 (the entire content of which is incorporated herein by reference).

TECHNICAL FIELD

The subject matter described herein generally relates to electric assemblies, and more particularly relates to electric current connector assemblies for use in vehicles.

BACKGROUND OF THE INVENTION

Hybrid electric, fully electric, fuel cell, and other fuel efficient vehicles are becoming increasingly popular. Electric and hybrid electric vehicles utilize high voltage battery packs or fuel cells that deliver electric current necessary to drive electric traction systems and other vehicle systems. These vehicles use thick electric current connectors to deliver high power operating current from battery packs, fuel cells, and/or other power sources to electric motors and other electric devices and systems of the vehicle, and also between two or more such electric motors and other electric devices and systems of the vehicle.

In addition, these vehicles typically include electric current sensors for each of the electric current connectors. However, the electric current connectors and their corresponding electric current sensors consume space and/or weight within the vehicle systems. Such space and/or weight can often be at a premium in today's hybrid and fuel cell vehicles, particularly with the increasing complexity and additional features often included in such vehicles.

Accordingly, it is desirable to provide improved electric current connector assemblies with electric current sensors, for example that provide an integrated electric current connector assembly and electric current sensor package. It also is desirable to provide improved electric current connector assemblies that potentially consume less space and/or weight in a hybrid or electric vehicle. In addition, it is desirable to provide improved electric current connector assemblies that are potentially less costly to produce as compared to typical electric current connector devices and typical electric current sensor packages. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, an assembly for transporting electric current in a vehicle is provided. The assembly comprises a connector and a sensor package. The connector comprises a plurality of prongs. The plurality of prongs are configured to receive and transport electric current. The sensor package is electrically coupled to the connector, and comprises a plurality of sensors. Each of the plurality of sensors is electrically coupled to a different one of the plurality of prongs, and is configured to determine a measure of electric current thereof.

In accordance with another exemplary embodiment of the present invention, another assembly for transporting electric current in a vehicle is provided. The assembly comprises a housing, a first connector, a second connector, a first sensor package, and a second sensor package. The first connector is disposed at least partially within the housing, and comprises a first plurality of prongs. The first plurality of prongs are configured to receive and transport electric current. The second connector is also disposed at least partially within the housing, and comprises a second plurality of prongs. The second plurality of prongs are also configured to receive and transport electric current. The first sensor package is electrically coupled to the first connector, and comprises a first plurality of sensors. Each of the first plurality of sensors is electrically coupled to a different one of the first plurality of prongs, and configured to determine a first measure of electric current thereof. The second sensor package is electrically coupled to the second connector, and comprises a second plurality of sensors. Each of the second plurality of sensors is electrically coupled to a different one of the second plurality of prongs, and is configured to determine a second measure of electric current thereof.

In accordance with a further exemplary embodiment of the present invention, yet another assembly for transporting electric current in a vehicle is provided. The assembly comprises a housing, a shell, a connector shell, a sensor shell, a connector, and a sensor package. The connector shell is disposed at least partially within the housing. The sensor shell is also disposed at least partially within the housing. The connector is disposed at least partially within the connector shell, and comprises a plurality of prongs. Each of the plurality of prongs is configured to receive and transport electric current. The sensor package is disposed at least partially within the sensor shell, and is electrically coupled to the connector. The sensor package comprises a plurality of sensors. Each of the plurality of sensors is disposed at least partially within the shell. Each of the plurality of sensors is electrically coupled to a different one of the plurality of prongs, and is configured to determine a measure of electric current thereof.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

Figure 1:
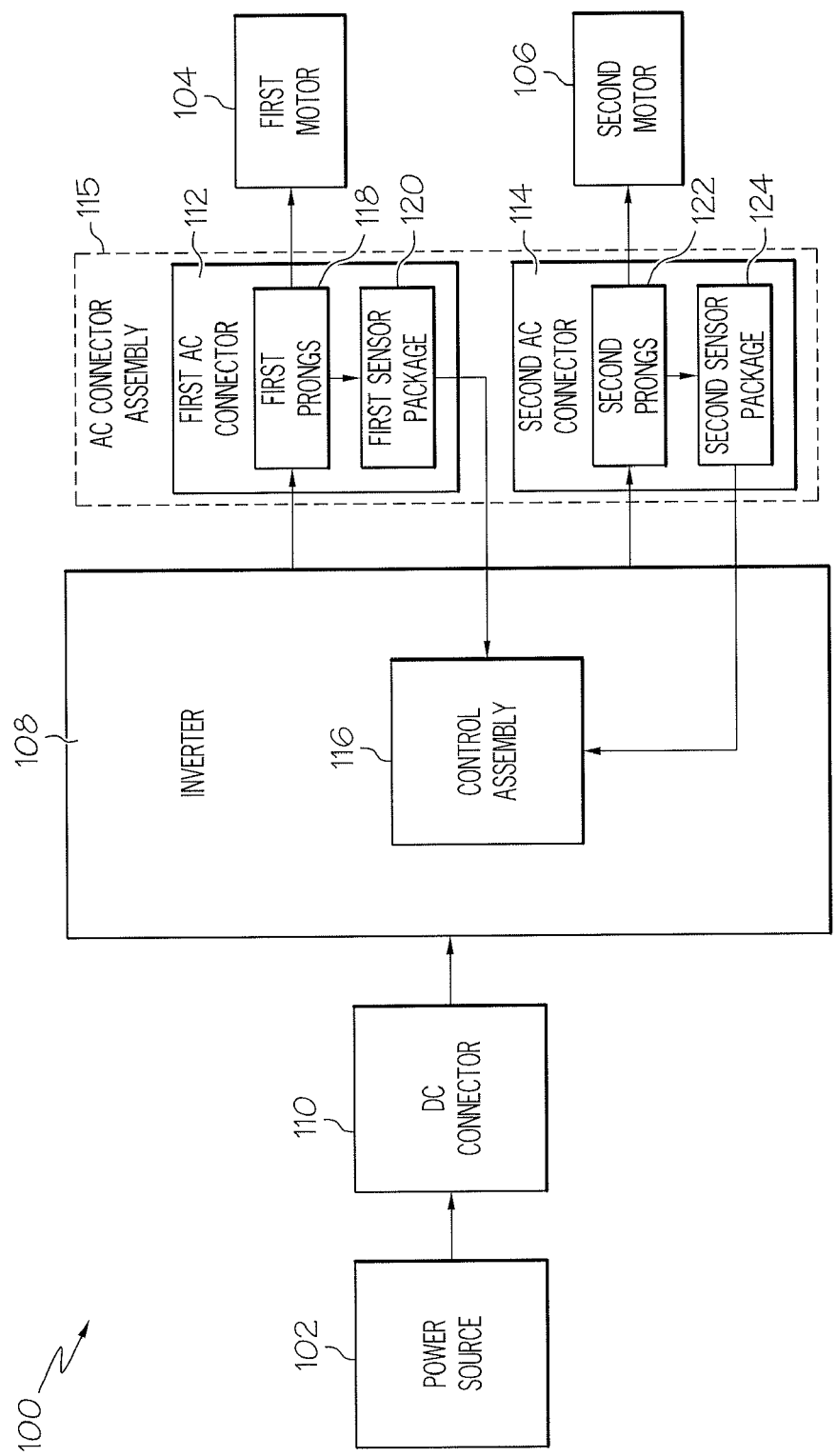
FIG. 1 is a functional block diagram of a motor system of a vehicle, in accordance with an exemplary embodiment of the present invention.

FIG. 1 is a functional block diagram of a motor system 100 of a vehicle, in accordance with an exemplary embodiment of the present invention. The vehicle may be any one of a number of different types of automobiles, such, as, for example, a sedan, a wagon, a truck, a van, a sport utility vehicle (SUV), or any one of a number of other different types of automobiles or other vehicles. The vehicle may also include any one or more different types of engines, such as, for example, a gasoline or diesel fueled combustion engine, a flex fuel vehicle (FFV) engine that uses a mixture of gasoline and alcohol, a gaseous compound engine that uses a gaseous compound such as hydrogen and natural gas, a combustion/electric motor hybrid engine, an electric motor, or a fuel cell motor.

As depicted in FIG. 1, the motor system 100 includes a power source 102, a first motor 104, a second motor 106, an inverter 108, a direct current (DC) connector 110, and an alternating current (AC) connector assembly 115. The power source 102 may include one or more batteries, fuel cells, and/or any number of other different types of power sources. It will be appreciated that the number of power sources, DC connectors, inverters, control assemblies and/or motors of the motor system 100 may vary from the depicted embodiments.

In the depicted embodiment, the power source 102 provides direct current to the inverter 108 via the DC connector 110. The inverter 108, which has a control assembly 116 that controls operation thereof, converts this direct current to alternating current, and provides this alternating current to the first and second motors 104, 106 via the AC connector assembly 115. In one preferred embodiment, the control assembly 116 may include one or more electric circuit boards. However, this may vary in other embodiments.

As depicted in FIG. 1, the AC connector assembly 115 includes a first connector 112 and a second connector 114. The first connector 112 has a first set of prongs 118 and a first sensor package 120. The first set of prongs 118 transports the alternating current to the first motor 104. The first sensor package 120 determines a first measure of current of the first set of prongs 118, and provides this first measure of current to the control assembly 116 for use in controlling the inverter 108.

Similarly, the second connector 114 has a second set of prongs 122 and a second sensor package 124. The second set of prongs 122 transports the alternating current to the first motor 104. The second sensor package 124 determines a second measure of current of the second set of prongs 122, and provides this second measure of current to the control assembly 116 for use in controlling the inverter 108.

More detailed illustrations of the alternating current connector assembly 115, including the first and second connectors 112, 114 thereof, are provided in FIGS. 2-5, and will be described in greater detail below in connection therewith. It will be appreciated that the number and/or nature of the connectors in the alternating current connector assembly 115 may vary. In addition, the alternating current connector assembly 115 and/or the components thereof may also be utilized in connection with different types of vehicle devices, assemblies, and/or systems in various embodiments of the present invention.

Figure 2:
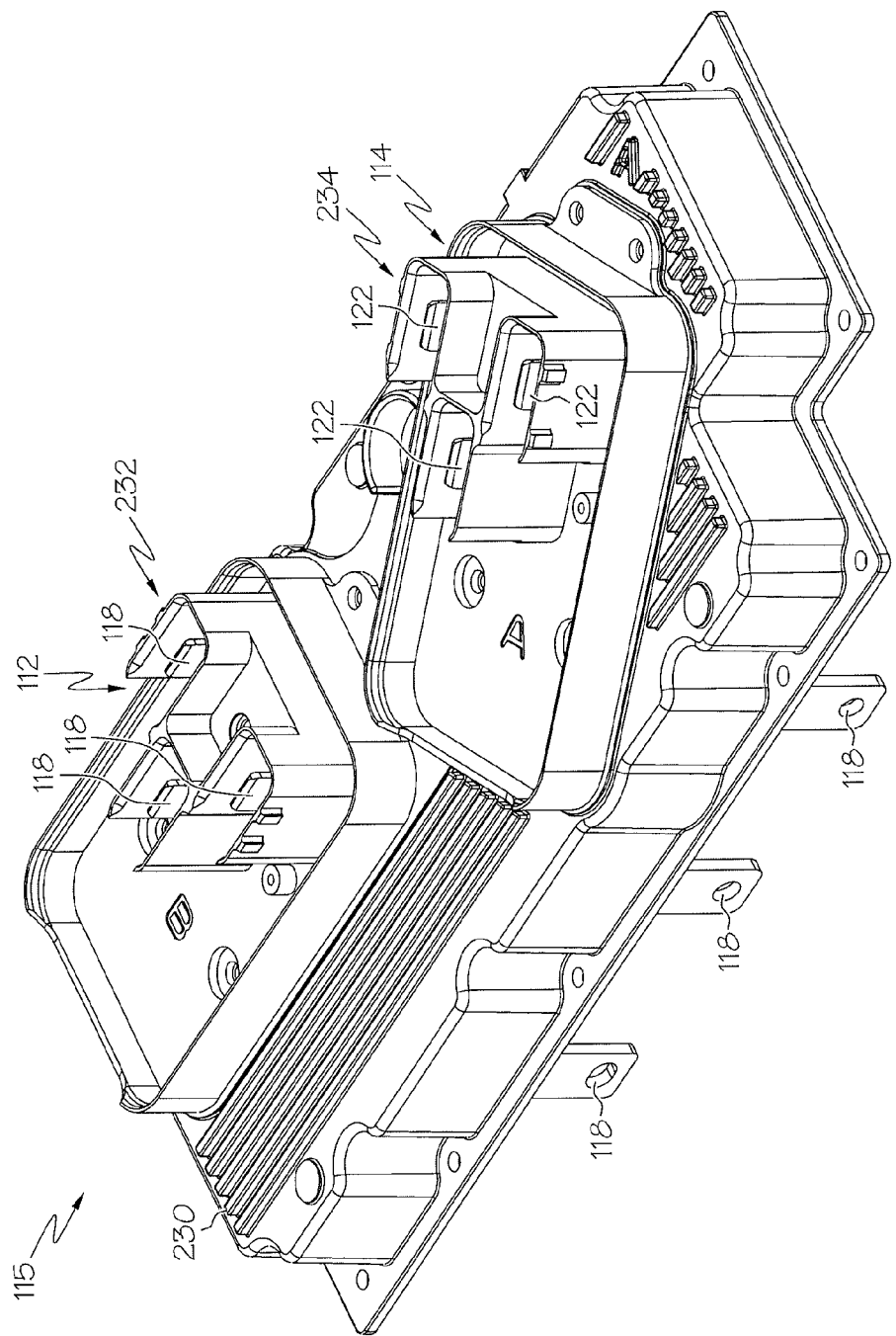
FIG. 2 is a perspective view of an alternating current connector assembly of the motor system of FIG. 1 having two connectors and two corresponding integrated current sensor packages, in accordance with an exemplary embodiment of the present invention.

FIG. 2 is a perspective view of an alternating current connector assembly 115 for a vehicle, in accordance with an exemplary embodiment of the present invention. In a preferred embodiment, the alternating current connector assembly 115 is part of the motor system 100 of FIG. 1 and is electrically coupled between an inverter and two motors of the vehicle, as is depicted in FIG. 1. However, this may vary in other embodiments. For example, in certain other embodiments, the alternating current connector assembly 115 electrically connects two motors of a hybrid vehicle and transports alternating current between the two motors. In one such exemplary embodiment, one of the motors may serve as a generator while the other motor powers the vehicle. In another such exemplary embodiment, one of the motors may be used to power the vehicle while the vehicle is in a forward gear, while the other motor may be used to power the vehicle while the vehicle is in a reverse gear. Also in various embodiments, any number of different inverters, motors and/or other devices may be electrically coupled by the alternating current connector assembly 115.

As depicted in FIG. 2, the AC connector assembly 115 includes the above-referenced first connector 112, with its first set of prongs 118, and second connector 114, with its second set of prongs 122. Also, in a preferred embodiment, the AC connector assembly 115 further includes a common housing 230, for example as shown in FIG. 2. In a preferred embodiment, the first and seconds of prongs 118, 122 extend through the length of the housing 230 in connecting the inverter, such as the inverter 108 of FIG. 1, on one end of the housing 230 to multiple motors, such as the first and second motors 104, 106, respectively, of FIG. 2 on the other end of the housing 230.

Also as depicted in FIG. 2, the first connector 112 includes a first connector shell 232, in addition to the above-referenced first set of prongs 118 (also depicted in FIG. 2) and first sensor package 120 (not depicted in FIG. 2). Similarly, the second connector 114 includes a second connector shell 234, in addition to the above-referenced second set of prongs 122 (also depicted in FIG. 2) and second sensor package 124 (not depicted in FIG. 2). The connector shells 232, 234 preferably are formed at least partially within the housing 230. In one preferred embodiment, the connector shells 232, 234 are cast together with the housing 230 as a single piece. However, this may vary in other embodiments.

The first and second connectors 112, 114 are housed within the housing 230 and, more specifically, within their respective first and second connector shells 232, 234 that are formed at least partially within the housing 230. Accordingly, in the exemplary embodiment discussed above, each of the first and second connectors 112, 114 is housed within a different corresponding one of the first or second connector shells 232, 234 but within the same common housing 230. However, this may vary in other embodiments.

Each connector 112, 114 is configured to receive and transport electric current. Specifically, in a preferred embodiment, each connector 112, 114 receives alternating current from one or more motors of the vehicle and transports the electric current to one or more other motors of the vehicle.

Figure 6:
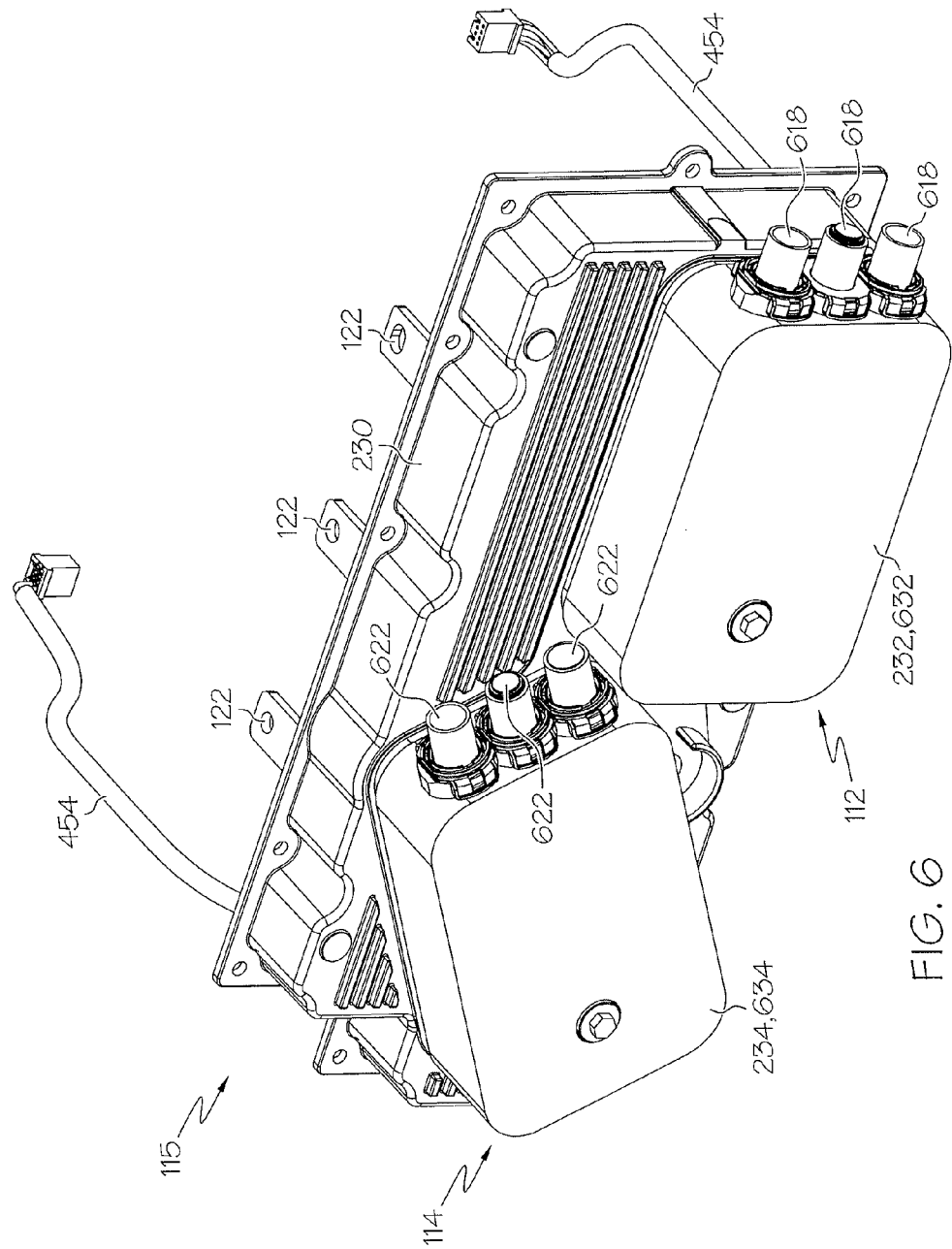
FIG. 6 is another perspective view of the alternating current connector assembly of FIG. 2, shown from a top angle view with female connectors that are coupled to prongs of the two connectors of FIG. 2, in accordance with an exemplary embodiment of the present invention.
Figure 7:
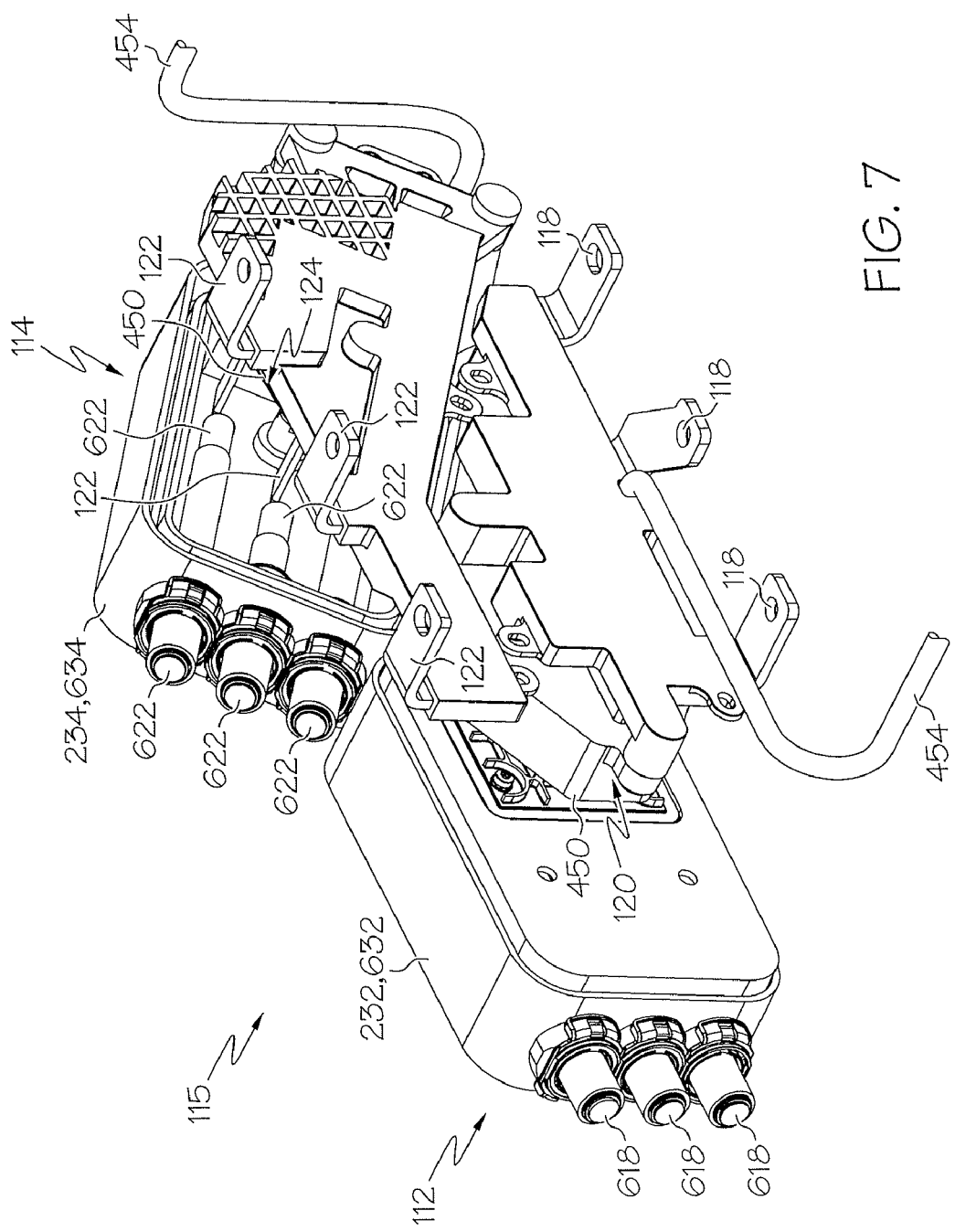
FIG. 7 is another perspective view of the alternating current connector assembly of FIG. 2, shown from a bottom angle view with female connectors that are coupled to prongs of the two connectors of FIG. 2, and shown with a portion of a connector housing of one of the connectors removed for illustrative purposes to show the coupling of the female connectors with the prongs of one of the connectors, in accordance with an exemplary embodiment of the present invention.

As referenced above, each connector 112, 114 includes a respective set of prongs 118, 122. In the depicted embodiment, each of the first and second sets of prongs 118, 122 includes three prongs for transporting alternating current. In certain embodiments, each connector 112, 114 also includes three female mating connections (not depicted in FIG. 2, but depicted in FIGS. 6 and 7 as female mating connections 618 and 622, respectively, and described further below in connection therewith), preferably one such female mating connection electrically coupled to each prong of the respective first and second sets of prongs 118, 122 (for example, as shown in FIGS. 6 and 7 with the first female mating connections 618 electrically coupled to the first set of prongs 118 and the second female mating connections 622 coupled to the second set of prongs 122, and as described further below in connection with FIS. 6 and 7). Unless expressly stated otherwise, "coupled" means that one element or feature is directly or indirectly joined to (or directly or indirectly communicates with) another element or feature, and not necessarily mechanically. Such female mating connections are housed within the connector shell 232, 234 for the corresponding connector 112, 114 in a preferred embodiment. In other embodiments, each connector 112, 114 may be electrically coupled to three female mating connections, each of which is preferably electrically coupled to a different prong of a corresponding one of the first or second sets of prongs 118, 122 corresponding to one of the connectors 112, 114. In a preferred embodiment, the female mating connections electrically couple the first and second prongs 118, 122 to one or motors, for example to one or more windings thereof.

As mentioned, each prong of the first and second sets of prongs 118, 122 is configured to receive and transport electric current. In a preferred embodiment, each such prong, also commonly referred to in the industry as a busbar, has an electrically conductive body. In certain non-limiting embodiments, each prong can handle currents up to 200 amps. In a preferred embodiment, each prong is made of copper or a copper alloy. However, this may also vary in other embodiments.

Together, each of the sets of prongs 118, 122 of a corresponding connector 112, 114 preferably receives alternating current emanating from a first source and transports the alternating current in a direction toward a second source. For example, in one exemplary embodiment, each of the sets of prongs 118, 122 receives alternating current from an inverter of the vehicle, such as the inverter 108 of FIG. 1, and transports the alternating current to one of the motors of the vehicle, such as the first or second motor 104, 106 of FIG.

Also in a preferred embodiment, the prongs 118, 122 transport and supply the alternating electric current to the one or more intended motors 104, 106 also at least in part via the female mating connections (for example, the first and second female connections 618, 622 of FIGS. 6 and 7 and described below in connection therewith), which are preferably electrically coupled therebetween. For example, in one preferred embodiment, alternating current is provided from the first and second connectors 112, 114 to the female mating connections and ultimately to the one or more intended motors 104, 106.

Figure 3:
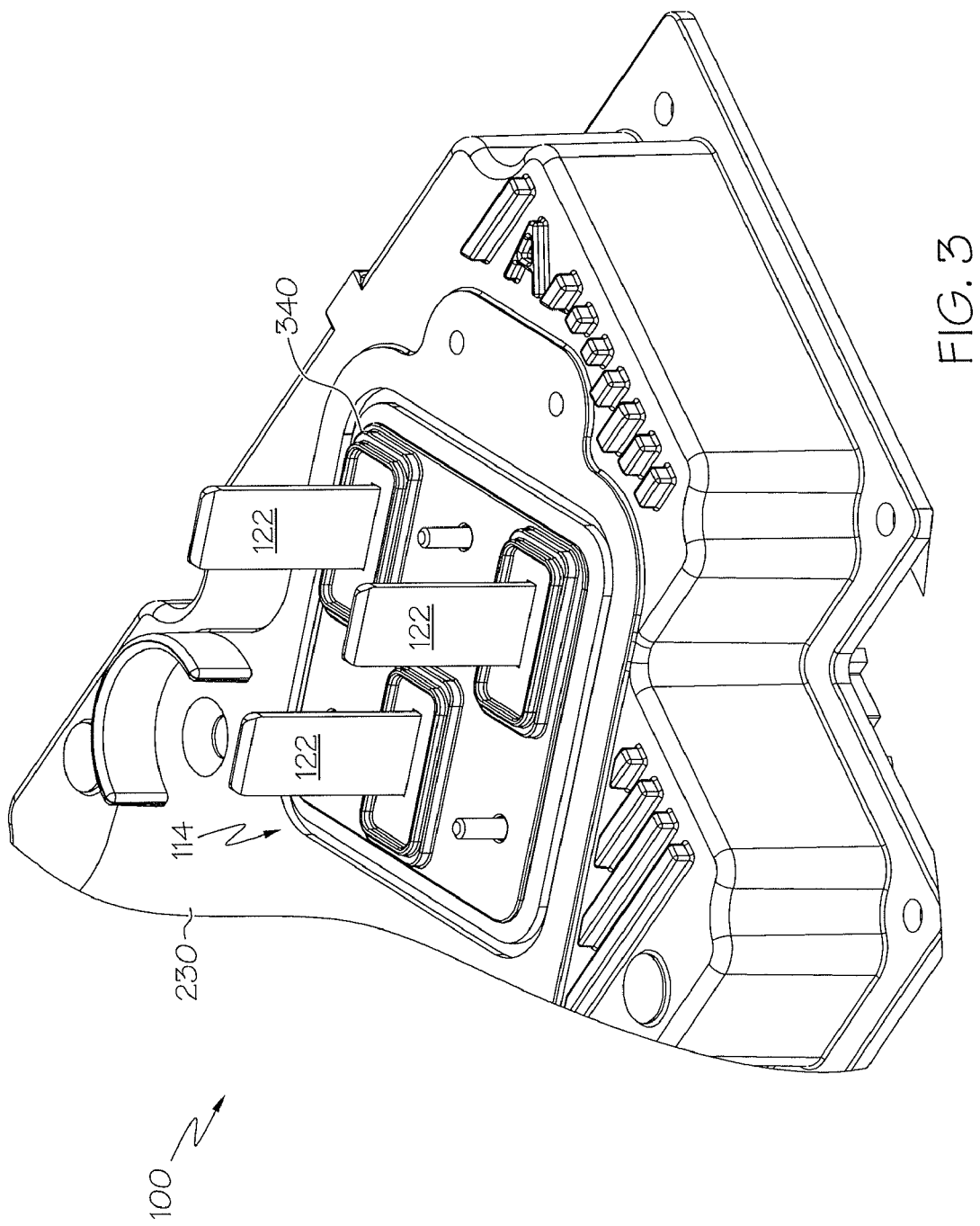
FIG. 3 is a perspective view of a portion of the alternating current connector assembly of FIG. 2, including a portion of one of the connectors thereof, in accordance with an exemplary embodiment of the present invention.

FIG. 3 is a perspective view of a portion of the AC connector assembly 115 of FIG. 2, including a portion of one of the connectors, specifically connector 114, in accordance with an exemplary embodiment of the present invention. As depicted in FIG. 3, in a preferred embodiment, the first connector 112 includes an insulator 340. For example, in the depicted embodiment in which the alternating current connector assembly 115 has two connectors 112, 114, the first connector 112 preferably includes a first insulator 340 (depicted in FIG. 3) that at least partially surrounds the first set of prongs 118 of the first connector 112. In addition, the second connector 114 (not depicted in FIG. 2) preferably includes a similar, second insulator (also not depicted in FIG. 3) that at least partially surrounds a second set of prongs 122 of the second connector 114.

Figure 4:
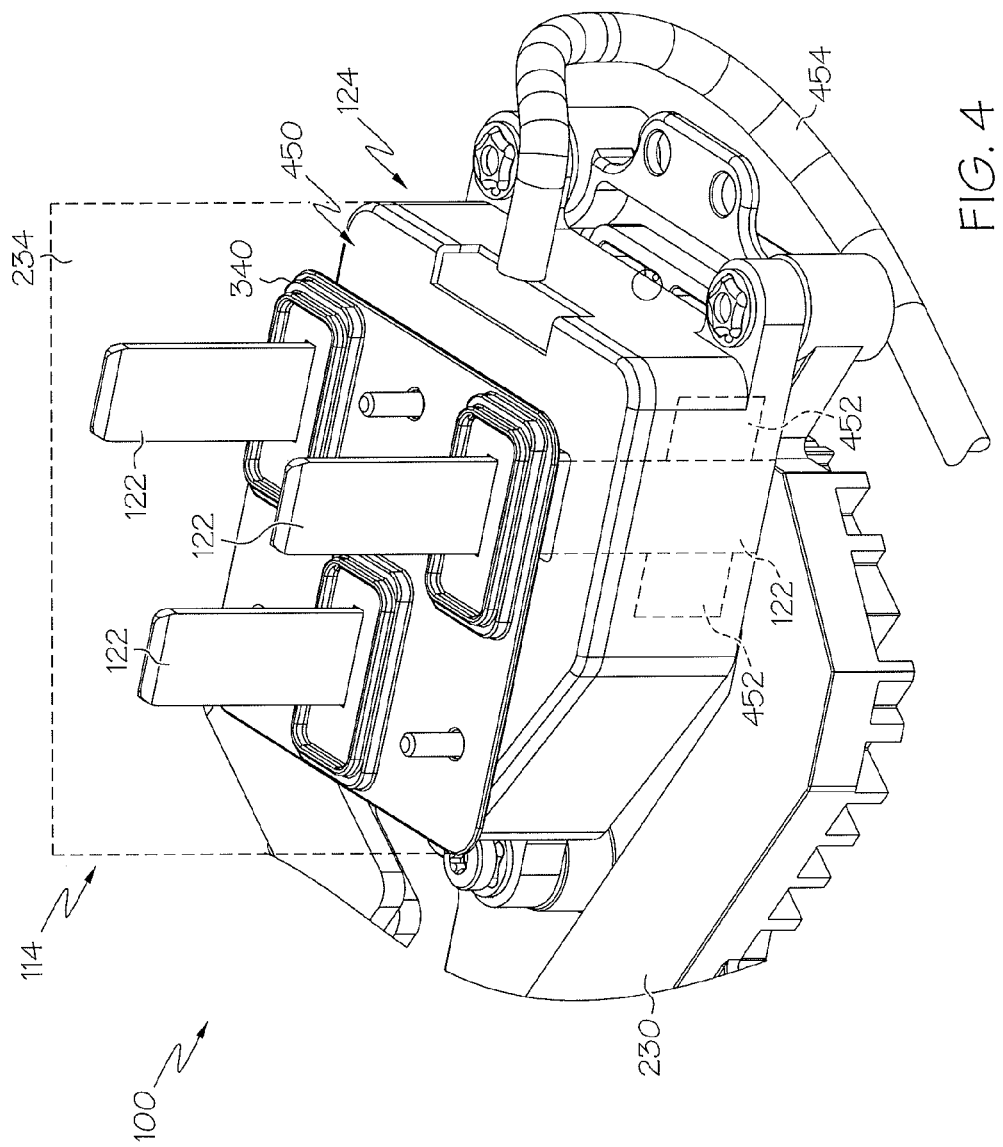
FIG. 4 is a perspective view of a portion of the alternating current connector assembly of FIG. 2, including a portion of one of the connectors thereof and a corresponding one of the alternating current sensor packages thereof, in accordance with an exemplary embodiment of the present invention.

The first insulator 340 preferably at least partially surrounds each of the first set of prongs 118, for example as shown in FIG. 3. In addition, the first insulator 340 preferably is disposed between the first set of prongs 118 and the first sensor package 120 of FIG. 1, as shown in FIG. 4 (described below). The second (non-depicted) insulator preferably at least partially surrounds each of the second set of prongs 122 in a similar manner. In addition, the second insulator preferably is similarly disposed between the second set of prongs 122 and the second sensor package 124 of FIG. 1.

FIG. 4 is a perspective view of a portion of the alternating current connector assembly 115 of FIG. 2, including a portion of the second connector 114 and the second sensor package 124 thereof, in accordance with an exemplary embodiment of the present invention. The second sensor package 124 includes a plurality of sensors 452 (one is depicted in phantom in FIG. 4). Specifically, in a preferred embodiment, the second sensor package 124 includes one sensor 452 for each prong of the second set of prongs 122 corresponding to the second connector 114. Also in a preferred embodiment, the first sensor package 120 (not depicted in FIG. 4) similarly includes one sensor 452 for each prong of the first set of prongs 118 corresponding to the first connector 112. Accordingly, in a preferred embodiment in which each connector 112, 114 has three prongs 118, 122, each sensor package 120, 124 likewise has three sensors 452.

In a preferred embodiment, each of the sensors 452 of a particular sensor package 120, 124 is disposed within a common sensor shell 450 for the particular sensor package 120, 124. However, preferably each sensor package 120, 124 has its own different sensor shell 450. Accordingly, sensors 452 of different sensor packages 120, 124 are preferably housed within different sensor shells 450. In a preferred embodiment, each sensor 452 is disposed proximate and determines a measure of electric current of a corresponding one of the prongs 118, 122 of the respective connector 112, 114 corresponding to the respective sensor package 120, 124 to which the sensor 452 belongs. Accordingly, in the embodiment depicted in FIG. 2 in which the alternating current connector assembly 115 includes two connectors 112, 114, each of a first plurality of sensors (not depicted in FIG. 4) belonging to the first sensor package 120 determines a first measure of electric current of one of the first set of prongs 118 belonging to the first connector 112. Similarly, in this embodiment, each of a second plurality of sensors 452 (depicted in FIG. 4) belonging to the second sensor package 124 determines a second measure of electric current of one of the second set of prongs 122 belonging to the second connector 114.

As indicated in FIGS. 2-4, preferably each of the second set of prongs 122 extends not only through the second connector shell 234 but also through the sensor shell 450 of the second sensor package 124. Likewise, each of the first set of prongs 118 preferably extends not only through the first connector shell 232 but also through a similar sensor shell of the first sensor package 120.

In addition, in a preferred embodiment, each prong 118, 122 extends through at least a portion of a different one of the sensors 452 within the corresponding sensor shell 450 corresponding to the sensor package 120, 124 to which the sensor 452 belongs, for example as shown in phantom in FIG. 4. In addition, most preferably each of the sensors 452 surrounds a portion of a corresponding prong 118, 122 that passes therethough within the corresponding sensor shell 450. However, this may vary in other embodiments.

The exemplary second connector 114 of FIG. 4 is depicted without its second connector shell 234 for illustrative purposes, for example to display the second set of prongs 122 and the insulator 340. In a preferred embodiment, the sensor shell 450 of each particular sensor package 120, 124 is at least substantially aligned with the respective connector shell 232, 234 of the respective connector 112, 114 corresponding to the respective sensor package 120, 124 (i.e. with a particular corresponding connector shell 232, 234 that corresponds thereto).

Preferably each particular sensor shell 450 is aligned both in terms of proximity and geometry with the connector shell 232, 234 corresponding thereto, for example as shown in FIG. 4 as well as FIG. 7 (discussed further below). Specifically, each particular sensor shell 450 is preferably nearly adjacent to the connector shell 232, 234 corresponding thereto, with one of the above-referenced insulators 340 preferably disposed between each such particular sensor shell 450 and the particular connector shell 232, 234 corresponding thereto. In addition, each sensor shell 450 is preferably designed such that it fits at least approximately directly underneath and within the particular connector shell 232, 234 corresponding thereto, without protruding laterally beyond the particular connector shell 232, 234 corresponding thereto except in a downward direction into the housing, for example as is illustrated in FIGS. 2-4 (for example, in FIGS. 2-4, each sensor shell 450 cannot be seen from the perspective views unless the particular connector shell 232, 234 is removed for illustrative purposes, due to this configuration). This preferred configuration allows for the sensors 452 to be housed in proximity to portions of the respective prongs 118, 122 corresponding thereto that extend within the respective particular connector shell 232, 234 corresponding thereto, while otherwise minimizing space around the sensors 452 and the respective prongs 118, 122 corresponding thereto. However, this may vary in other embodiments.

Also in a preferred embodiment, the sensor shell 450 is shaped at least approximately similar to the corresponding connector shell 232, 234 to allow for tight and compact packaging for the sensors 452 disposed within the sensor shell 450. The packaging and integration of the connectors 112, 114 and the respective sensor packages 120, 124 in close proximity to one another and within the common housing 230 allows for potential savings in space, weight, and/or manufacturing costs associated with the AC connector assembly 115, among other potential benefits thereof. In addition, the above-referenced shaping and coordination of the connector shells 232, 234 with their corresponding sensor shells 450 provide for additional for potential savings in space, weight, and/or manufacturing costs associated with the alternating current connector assembly 115, among other potential benefits.

Also as shown in FIG. 4, in one preferred embodiment, the second connector 114 preferably also includes a cable 454 that electrically connects the sensors 452 to a control assembly, such as the control assembly 116 of the inverter 108 of FIG. 1. Specifically, in this preferred embodiment, the second sensor package 124 supplies the second measure of current of the second set of prongs 122 to the control assembly via the cable 454 depicted in FIG. 4. Also in a preferred embodiment, the first connector 112 includes a similar cable 454 (for example, as shown in FIG. 7, discussed below that electrically connects the sensors 452 of the first sensor package 120 to a control assembly, such as the control assembly 116 of the inverter 108 of FIG. 1. Specifically, in this preferred embodiment, the first sensor package 120 supplies the first measure of current of the first set of prongs 118 to the control assembly via a cable that is similar to the cable 454 depicted in FIG. 4.

Figure 5:
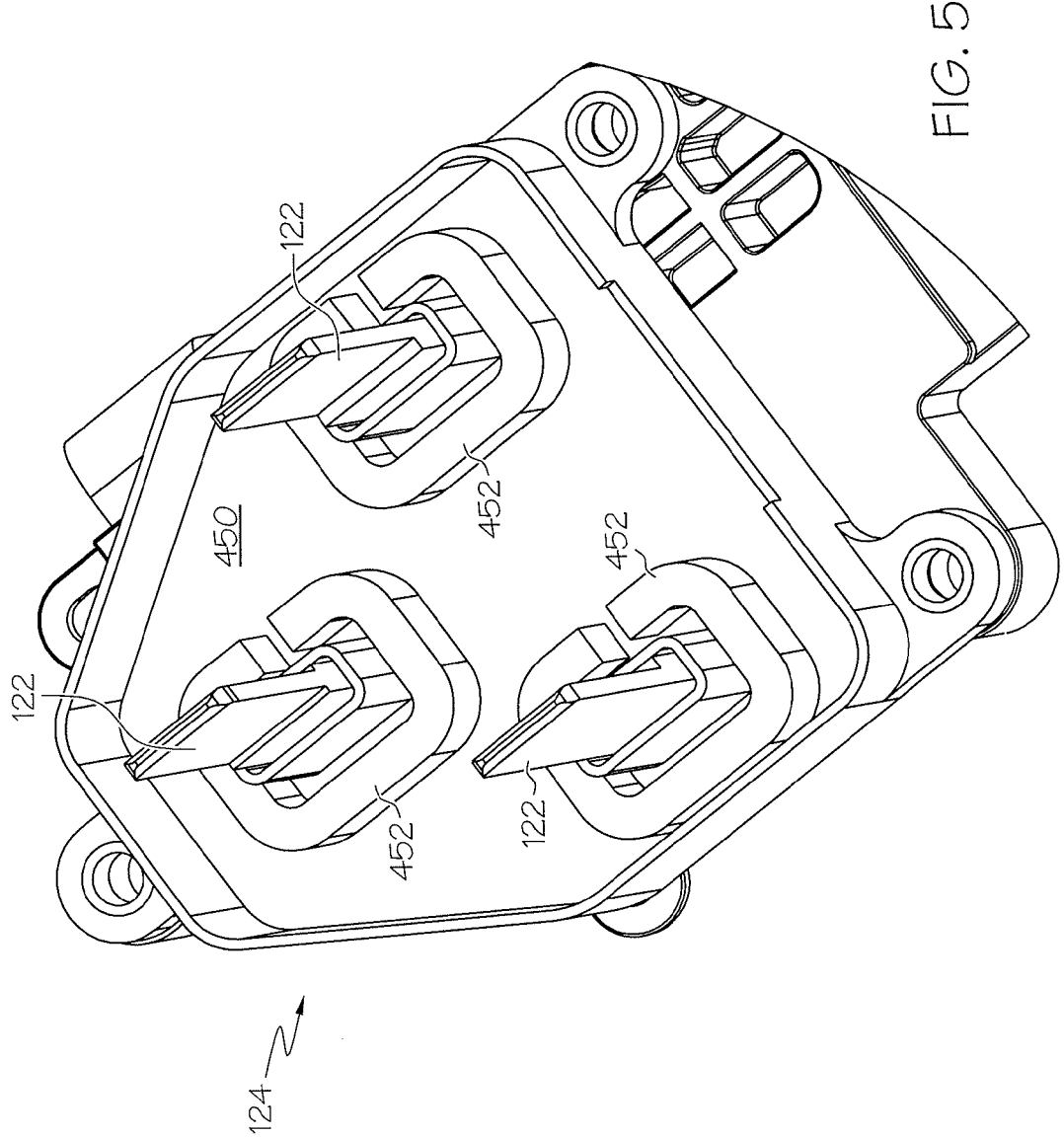
FIG. 5 is a perspective view of a portion of the alternating current connector assembly of FIG. 2, including a portion of one of the sensor packages thereof and a corresponding set of prongs, in accordance with an exemplary embodiment of the present invention.

Turning now to FIG. 5, a perspective view of a [is this an underside portion?] portion of the AC connector assembly 115 of FIG. 2 is provided, including a portion of the second sensor package 124 thereof, in accordance with an exemplary embodiment of the present invention. As depicted in FIG. 5, a different sensor 452 preferably extends radially around a portion of a different one of each of the second set of pongs 122 of the second connector 114. Likewise, a similar non-depicted sensor preferably extends radially around a portion of a different one of each of the first set of pongs 118 of the first connector 112.

Turning now to FIGS. 6 and 7, perspective views of the AC connector assembly 115 of FIG. 2 is provided, and showing first and second female mating connections 618, 622, respectively, used in connection therewith, in accordance with an exemplary embodiment of the present invention. Specifically, FIG. 6 provides a perspective view of the AC connector assembly 115 of FIG. 2 along with the first and second female mating connections 618, 622 thereof from a top angle view, while FIG. 7 provides another perspective view of the AC connector assembly 115 of FIG. 2 along with the first and second female mating connections 618, 622 thereof shown from a bottom angle view, and shown with a portion of a connector housing of one of the connectors removed for illustrative purposes to show the coupling of the female connectors 618, 622 with the sets of prongs 118, both in accordance with an exemplary embodiment of the present invention.

As shown in FIGS. 6 and 7, the first connector 112 includes a first set of female mating connections 618, and the second connector 114 includes a second set of female mating connections 622. The first set of female mating connections 618 extend through the first connector shell 232, including an outer portion 632 thereof as shown in FIGS. 6 and 7. Each of the first set of female mating connections 618 is coupled to a respective one of the first set of prongs 118. Similarly, the second set of female mating connections 622 extend through the second connector shell 234, including an outer portion 634 thereof as shown in FIGS. 6 and 7. Each of the second set of female mating connections 622 is coupled to a respective one of the second set of prongs 122.

FIGS. 6 and 7 also further illustrate the alignment of the sensor shells 450 of FIG. 4. As described above, each particular sensor shell 450 is preferably aligned both in terms of proximity and geometry with the connector shell 232, 234 corresponding thereto, for example as shown in FIG. 7 and, as previously discussed, in connection with FIGS. 2-4 as well. Also as described above, preferably each particular sensor shell 450 is disposed nearly adjacent to, the connector shell 232, 234 corresponding thereto. In addition, each sensor shell 450 is preferably designed such that it fits at least approximately directly underneath and within the particular connector shell 232, 234 corresponding thereto, without protruding laterally beyond the particular connector shell 232, 234 corresponding thereto except in a downward direction into the housing, for example as is illustrated in FIG. 7 as well as FIGS. 2-4 above, in accordance with exemplary embodiments of the present invention. However, it will be appreciated that this may vary in other embodiments.

In addition, FIGS. 6 and 7 also depict the two cables 454 that electrically connect the sensors 452 of FIGS. 4 and 5 to a control assembly, such as the control assembly 116 of the inverter 108 of FIG. 1. As mentioned above, in a preferred embodiment, first second package 120 supplies the above-referenced first measure of current of the first set of prongs 118 to the control assembly via a first such cable 454, and the second sensor package 124 supplies the second measure of current of the second set of prongs 122 to the control assembly via a second such cable 454, for example as depicted in FIG. 7 as well as FIG. 4 (described above). However, it will similarly be appreciated that this may also vary in other embodiments.

Accordingly, improved electric current connectors assemblies are provided in accordance with various exemplary embodiments of the present invention. The improved electric current connector assemblies include integrated connectors and sensor packages in preferred embodiments. The integration of the electric current connectors and sensor packages results in electric current connector assemblies that potentially consume less space and/or weight in vehicle systems as compared with typical electric current connectors in vehicles, and/or that is potentially less costly to produce.

While the disclosed electric current connector assembly is described above as preferably being implemented in a hybrid automobile as electrically coupling an inverter and a motor or as electrically coupling two or more motors of the hybrid vehicle, it will be appreciated that the electric current connector assembly in various embodiments can be implemented in connection with any number of different types of vehicles and in electrically coupling any number of different types of motors, devices, and/or systems thereof and/or in connection therewith. It will similarly be appreciated that various features and elements of the disclosed electric current connector assembly may vary from those depicted in the Figures and/or described herein in certain embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An assembly for transporting electric current in a vehicle, the assembly comprising:
   a connector comprising a plurality of prongs configured to receive and transport electric current; and
   a sensor package electrically coupled to the connector, the sensor package comprising a plurality of sensors, each of the plurality of sensors electrically coupled to a different one of the plurality of prongs and configured to determine a measure of electric current thereof.

2. The assembly of claim 1, further comprising:
   a housing;
   wherein the connector and the sensor package are disposed at least partially within the housing.

3. The assembly of claim 2, further comprising:
   a connector shell formed at least partially within the housing; and
   a sensor shell formed at least partially within the housing,
   wherein the connector is housed at least partially within the connector shell and the sensor package is disposed at least partially within the sensor shell.

4. The assembly of claim 3, wherein the sensor shell is at least substantially aligned with the connector shell.

5. The assembly of claim 3, further comprising:
   an insulator disposed between the connector shell and the sensor shell.

6. The assembly of claim 1, wherein each of the plurality of prongs is disposed proximate at least a portion of a respective one of the plurality of sensors.

7. The assembly of claim 1, wherein the vehicle has an inverter, and the assembly further comprises:
   a cable coupled between the sensor package and the inverter and configured to at least facilitate transporting the measure of electric current of the plurality of prongs from the sensor package to the inverter.

8. The assembly of claim 7, wherein:
   the vehicle has a motor; and
   the plurality of prongs are configured to transport electric current at least partially between an inverter and a motor of the vehicle.

9. An assembly for transporting electric current in a vehicle, the assembly comprising:
   a housing;
   a first connector disposed at least partially within the housing, the first connector comprising a first plurality of prongs configured to receive and transport electric current;
   a second connector disposed at least partially within the housing, the second connector comprising a second plurality of prongs configured to receive and transport electric current;
   a first sensor package comprising a first plurality of sensors, each of the first plurality of sensors electrically coupled to a different one of the first plurality of prongs and configured to determine a first measure of electric current thereof; and
   a second sensor package comprising a second plurality of sensors, each of the second plurality of sensors electrically coupled to a different one of the second plurality of prongs and configured to determine a second measure of electric current thereof.

10. The assembly of claim 9, wherein:
    each of the first plurality of prongs is disposed proximate at least a portion of a respective one of the first plurality of sensors; and
    each of the second plurality of prongs is disposed proximate at least a portion of a respective one of the second plurality of sensors.

11. The assembly of claim 10, further comprising:
    a first connector shell formed at least partially within the housing;
    a second connector shell formed at least partially within the housing;
    a first sensor shell disposed at least partially within the housing; and
    a second sensor shell disposed at least partially within the housing;
    wherein:
       the first connector is housed at least partially within the first connector shell;

the second connector is housed at least partially within the second connector shell;

the first sensor package is housed at least partially within the first sensor shell; and the second sensor package is housed at least partially within the second sensor shell.

12. The assembly of claim 11, wherein:

the first sensor shell is at least substantially aligned with the first connector shell; and the second sensor shell is at least substantially aligned with the second connector shell.

13. The assembly of claim 12, further comprising:

a first insulator disposed between the first connector shell and the first sensor shell; and a second insulator disposed between the second connector shell and the second sensor shell.

14. The assembly of claim 9, wherein:

the vehicle has an inverter, a first motor, and a second motor;

the first plurality of prongs are configured to transport electric current at least partially between the inverter and the first motor; and the second plurality of prongs are configured to transport electric current at least partially between the inverter and the second motor.

15. The assembly of claim 14, further comprising:

one or more cables coupled between the first and second sensor packages and the inverter, the one or more cables configured to:

transport the first measures of electric current of the first plurality of prongs from the first sensor package to the inverter; and transport the second measures of electric current of the second plurality of prongs from the second sensor package to the inverter.

16. An assembly for transporting electric current in a vehicle, the assembly comprising:

a housing;

a connector shell disposed at least partially within the housing;

a connector disposed at least partially within the connector shell, the connector comprising a plurality of prongs, each of the plurality of prongs configured to receive and transport electric current; and a sensor shell disposed at least partially within the housing; and a sensor package disposed at least partially within the sensor shell and comprising a plurality of sensors each disposed at least partially within the sensor shell, each of the plurality of sensors electrically coupled to a different one of the plurality of prongs and configured to determine a measure of electric current thereof.

17. The assembly of claim 16, wherein the sensor shell is at least substantially aligned with the connector shell.

18. The assembly of claim 17, further comprising:

an insulator disposed between the connector shell and the sensor shell.

19. The assembly of claim 18, wherein:

the vehicle has an inverter and a motor; and the plurality of prongs are configured to transport electric current at least partially between the inverter and the motor.

20. The assembly of claim 16, further comprising:

a second connector shell disposed at least partially within the housing;

a second sensor shell disposed at least partially within the housing;

a second connector disposed at least partially within the second connector shell, the second connector comprising a second plurality of prongs, each of the second plurality of prongs configured to receive and transport electric current; and a second sensor package disposed at least partially within the second sensor shell and comprising a second plurality of sensors each disposed at least partially within the second connector shell, each of the second plurality of sensors electrically coupled to a different one of the second plurality of prongs and configured to determine a second measure of electric current thereof.

* * * * *